Aug. 6, 1968　　　　　M. BALLESTRA　　　　3,395,990
APPARATUS FOR EFFECTING CONTINUOUS EXOTHERMIC REACTION
BETWEEN AT LEAST TWO FLUID REAGENTS
Filed May 24, 1965

United States Patent Office 3,395,990
Patented Aug. 6, 1968

3,395,990
APPARATUS FOR EFFECTING CONTINUOUS EXOTHERMIC REACTION BETWEEN AT LEAST TWO FLUID REAGENTS
Mario Ballestra, Viale Bianca Maria 26, Milan, Italy
Filed May 24, 1965, Ser. No. 458,217
Claims priority, application Italy, May 23, 1964, 12,032/64
7 Claims. (Cl. 23—284)

ABSTRACT OF THE DISCLOSURE

An apparatus is provided for carrying out a continuous exothermic reaction between at least one gaseous reactant and at least one liquid reactant, where at least one of the reaction products is gaseous. The reaction is carried out by distributing the liquid reagent into the reactor in such a way that it forms a film which slides on an inner surface of a vertical wall of the reactor. The gaseous reagent enters the reactor through a cylinder mounted vertically and centrally inside the reactor. The gaseous stream exiting from the cylinder is directed into a helical path and into sliding contact with the surface of the film of liquid reagent. The resultant path of the gaseous stream is inclined with respect to the natural direction of fall of the liquid reagent; thus the gaseous current deflects the sliding of the liquid film from the direction of its normal fall and the contact between the liquid and gaseous reagent is thereby increased. The resultant liquid and gaseous streams exit through separate outlets provided in the reactor. The lower portion of the reactor is conically widened to facilitate the separation of the gaseous stream from the liquid stream.

This invention relates to a method and an apparatus for carrying out an exothermic reaction between at least one liquid and one gaseous reagent, and is particularly directed to a method and apparatus for carrying out such a reaction continuously.

It is often necessary to control a highly exothermic reaction by maintaining the temperature thereof below the danger point, particularly when the heat generated thereby can damage the reaction products. One of the arrangements often made for controlling the temperature of reaction is the provision inside the reactor of an efficient stirring device which, by moving the fluid contained therein, increases the transmission coefficient of the heat of the fluid with respect to the cooling surface existing inside the reactor. Such a method, of course, involves all of the usual problems connected with a device provided with elements in motion, designed to agitate a large fluid mass. Another arrangement commonly used to maintain the reaction at a low temperature is that of making the reaction take place in successive fractions in different reactors, however, such an arrangement has the disadvantage of high cost with respect to the increased expense required for the installations.

One object of the present invention is the provision of a method for carrying out exothermic reaction which avoids cited disadvantages. Another object is that of providing an installation and a method for carrying out an exothermic reaction whereby a high quality product is obtained and wherein the cost of the installation is below the normal value.

These and other objects are realized by the method and apparatus as set forth below in detail. According to the invention, the continuous reaction between at least two fluid reagents one of which is in the gaseous phase and one of which is in the liquid phase, wherein the reaction is highly exothermic, and wherein at least one of the reaction products is a liquid compound, is characterized in that after being fed into a vertical reactor the liquid reagent in the form of a film, and thus in a very thin layer, slides on a vertical wall which has a high thermal conductivity and which is suitably thermo-regulated; suitable diaphragms which extend for at least a portion of the reactor make the gaseous reagent slide on the surface of the liquid reagent with a pre-established velocity and direction; said gaseous reagent is thus directed into contact with the surface of the film of liquid reagent according to paths inclined with respect to the natural fall direction of the liquid reagent, though the vectors representing the velocities of the liquid and those representing the velocities of the liquid and the gas have an equidirected component; the gaseous current thereby deflects the sliding of the liquid film from the direction of its normal fall and thus increases the contact between liquid reagent and gaseous reagent; and the thickness of the film of the liquid is regulated by means of the velocity of the gas in contact.

The method of the invention is also characterized in that the path imposed by the diaphragms on the gaseous reagent is a helical path having as geometrical axis, that of the reactor, on the inner surface of which the film of the liquid reagent slides, according to a path defined by the resultant of the natural fall force and of the drawing force generated by the gaseous current; and in that the deflection of the path of the liquid film with respect to the natural fall path depends on the velocity and direction of the motion of the gaseous reagent. The helical path followed by the gaseous reagent generates on its particles a centrifugal force which increases the pressure exerted by the gaseous particles against the film of the liquid reagent, favoring the adherence of the liquid reagent against the controlled temperature wall, thereby improving the thermal exchange, and facilitating the absorption of the gaseous reagent by the liquid reagent so that the reaction is accelerated. Also, the pressure exerted by the gaseous particles regulates the thickness of the film of the liquid reagent. Since the density of the gas decreases corresponding to the increase of the distance from the surface of the liquid reagent, the increased density of the gaseous reagent against the inner wall of the cylinder also increases the efficiency of the reaction.

The method is further characterized in that the shape of the apertures through which the gaseous reagent is fed into the reactor is such as to favor the helical path that the diaphragm imposes on the gaseous particles, and in that the diaphragm directing the gaseous reagent is constituted by at least a helical surface. In order to improve the degree by which the temperature of the reaction is controlled, or if it is desirable, the diaphragm may be wound around a cylindrical surface having temperature regulating means.

In a particular embodiment of the present invention, the film of the liquid reagent is formed on the inner surface of the reactor by means of an annular port with regulable opening which is in contact with the inner surface of the reactor; the liquid reagent flows through said port pushed by a suitably regulable pressure.

The method of the invention is still further characterized in that the centrifugal action is imposed by the gaseous reagent on both the liquid reagent and on liquid products of the reaction formed inside the reactor, and that the centrifugal action is used to separate the gaseous compounds from the liquid compounds when they are removed from the reactor bottom. The separation of the gaseous products from the liquid ones is facilitated by a substantially conical widening of the lower portion of the reaction, by taking advantage of the facts that the liquid wets the reactor surface, and continues to slide on the wall in correspondence to said widened reactor, and that the centrifugal motion of liquid film imparted by the gas stream factors the adherence of the liquid film to the reactor wall; also the diaphragm defining the helical motion of the gaseous reagent is interrupted at the widened portion of the reactor so that the gas is collected in a stream from the center thereof.

The above method is finally characterized in that, in another particular embodiment of the present invention, the helical diaphragms are provided with a rotational movement according to the reactor axis.

Further objects, advantages and particularities of the invention will become obvious from the following description which involves embodiment forms chosen by way of example and with reference to the accompanying drawings.

Figure 2:
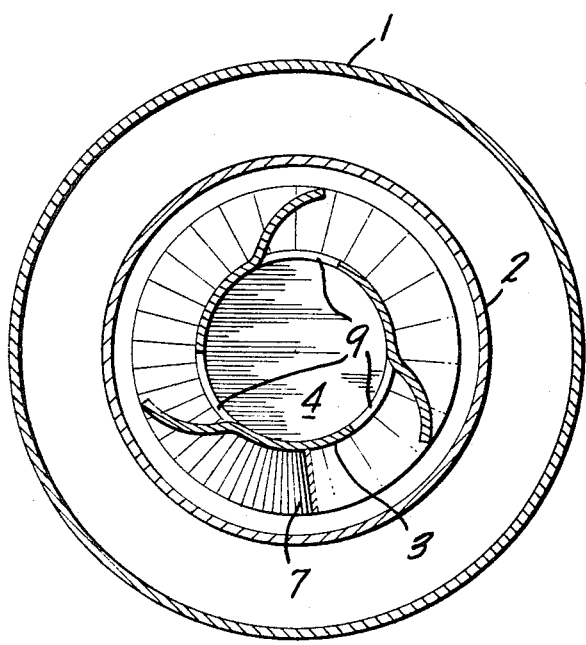
FIG. 2 is a schematic cross-section of the reactor taken along line 2—2 on FIG. 1.
Figure 1:
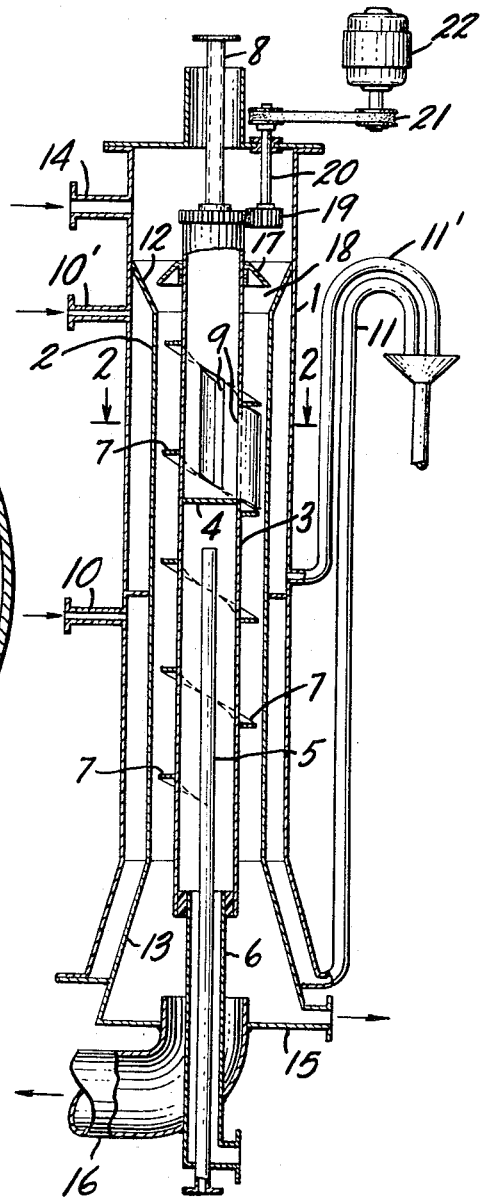
FIG. 1 is a longitudinal vertical section of the reactor.

The reactor includes an outer envelope 1, which surrounds the reactor wall 2, inside of which the film of liquid reagent flows; wall 2 is well cooled by means of a cooling fluid contained in the annular blind area comprised between the surfaces 1 and 2. Inside reactor wall 2 is the cylindric wall 3, which is vertical and parallel to the cylindric walls 1 and 2; a horizontal wall 4, divides the inside of cylinder 3 into two halves, an upper and a lower one, and inside the lower half are two coaxial and vertical pipes 5 and 6 by means of which a cooling liquid is allowed to enter and exit respectively to and from the inside of the lower portion of cylinder 3; a diaphragm 7, constituted by a helical surface is fastened on the outer surface of the cylinder 3 and arrives at a short distance from the liquid surface flowing along wall 2; the pipe 8 is the inlet for the gaseous reagent to the inside of the upper portion of cylinder 3, the gas exits from cylinder 3 through the slots 9 provided with ports directed in such a way as to feed the gaseous reagent in the direction of the channel with helical course provided between cylinder 2 and cylinder 3 by diaphragm 7; two inlets 10, 10' and two outlets 11 and 11' are provided for cooling fluids flowing in the blind area existing between cylinders 1 and 2, designed to cool surface 2; the outer jacket may be divided into different portions so as to use cooling fluids at different temperatures in relationship to the characteristics of fluidity and reaction degree of the product to be cooled; the surfaces 12 and 13, which are preferably frustoconical are connected with the upper and lower ends of cylinder 3; the inlet 14 is a conduit for the liquid reagent to the inside of the reactor, constituted by the annular blind area existing between cylinders 2 and 3; the outlet conduit 15 is provided for the reaction liquid products; and the discharge conduit 16 is provided for the reaction gaseous products; the delivery proportioning device 17 for proportioning the liquid reagent is substantially of frusto-conical shape, the lower edge of which grazes the frusto-conical surface 12 at a regulable distance. The operation is the following:

The liquid reagent flowing from the inlet conduit 14 is distributed in the form of a film, that is of a very thin layer, inside the cylindric surface 2; here it comes into contact with the gaseous reagent which, owing to diaphragm 7, runs along the length of the reactor according to a helical path. When reactions are in progress, the liquid film in contact with the inner surface of cylinder 2, includes a mixture of the liquid reagent and the liquid compounds produced by the reaction, while the gaseous flux running along the helical path around cylinder 3 includes a mixture of both the gaseous reagent and the reaction gaseous products. The helical motion of the gaseous reagent generates various positive effects on the course of the reaction; first the helical motion of the gaseous reagent transmits itself to the motion of the liquid reagent displacing it from its path of vertical fall and giving it a helical motion; so that with a given height of reactor the contact between the two reagents is increased and thereby the degree of reaction between the gaseous and liquid reagent is increased. Second, owing to their helical motion, the particles of the gaseous reagent are pushed by centrifugal force against the film of liquid reagent, increasing the contact thereof against the cooled wall 2, regulating the thickness of the liquid film and also thereby increasing the thermal exchange between the liquid film and said wall. Finally, owing to the centrifugal force, the gaseous reagent distributes against the surface of the liquid film in layers, the density of which decreases with the increase of the distance of the gaseous particles from the liquid film; in this way the gaseous particles are primarily condensed against the surface of the liquid reagent and accordingly the reaction efficiency is greatly increased. Further, the helical motion imparted first to the liquid reagent and then to the liquid compounds of the reaction makes the liquid film keep in contact with the inner surface of the reactor, even when the latter widens into the surface 13, allowing the reaction liquid products to flow through 15, while the gaseous products deflow through 16. The adherence between the liquid film and the wall 13 is further ensured in the cases where the reaction liquid products wet the material constituting the wall 13.

The thickness of the film of liquid reagent is also determined by means of the distance of the lower edge of the regulator 17 from the wall 12 and by means of the height of the liquid level pre-established above the lower edge of the regulator 17.

The adjustment of the temperature of the reactor and above all of the reaction product is obtained mainly by the cooling fluid acting on the outside of the reactor in the annular blind area comprised between cylinder 1 and cylinder 2; and in lower degree by the possible cooling fluid flowing inside the lower part of cylinder 3.

Although for purposes of illustration, the present invention has described with particularity on the basis of the embodiment set forth in the drawing this has been described and shown by way of example only, and many variations and additions may be made in embodying the invention, for instance in a preferred embodiment, cylinder 3 is made to turn about its geometric axis by means of a suitable driving element, for example by a gear 18 on a shaft 19 driven through a belt 20 by a motor 21. In such a case, suitable sealing gaskets are provided in the points where the rotating cylinder 3 crosses the stationary portions of the device. In another preferred embodiment, the gas velocity is increased by means of a fan and the reagent gas is recycled in order to increase the dilution thereof. These and other variations are however to be considered as based on the following claims.

I claim:

1. An apparatus for carrying out a continuous exothermic reaction between at least two fluid reagents wherein one of said reagents is in the gaseous phase and one is in the liquid phase and wherein at least one of the reaction products is in the gaseous phase which comprises a vertical reactor, means for feeding a liquid reagent into said reactor, means to regulate the flow of said liquid reagent, means to distribute said liquid reagent as a film on the inner surface of the vertical wall of said reactor, a cylinder mounted vertically and centrally inside said reactor provided with gaseous inlet means and exit means for gas to exit from said cylinder into said reactor means to direct the gas exiting from said cylinder through said exit means into sliding contact with the film of liquid reagent on said wall according to a path inclined with respect to the natural direction of fall of the liquid reagent, outlet means from said reactor for the liquid stream and separate outlet means for the gaseous stream, the lower portion of said reactor being conically widened to facilitate the separation of the gaseous stream from the liquid stream.

2. An apparatus as defined in claim 1 wherein said cylinder mounted vertically inside of said reactor is provided with cooling means.

3. An apparatus as defined in claim 1 wherein said cylinder mounted vertically inside of said reactor is divided into an upper and a lower section and wherein the gas exits into said reactor from said upper section and said lower section is provided with cooling means.

4. An apparatus for carrying out a continuous exothermic reaction between at least two fluid reagents wherein one of said reagents is in the gaseous phase and one is in the liquid phase and wherein at least one of the reaction products is in the gaseous phase, which comprises a vertical reactor, means for feeding a liquid reagent into said reactor, means to regulate the flow of said liquid reagent, means to distribute said liquid reagent as a film on the inner surface of the vertical wall of said reactor, means for cooling the vertical wall of said reactor, a cylinder mounted vertically and centrally inside said reactor provided with gaseous inlet means and exit means for gas to exit from said cylinder into said reactor, means to regulate the velocity at which said gas flows, a helical diaphram mounted around the outside of said cylinder extending almost to said vertical wall to direct said gas as it exits from said cylinder into a helical path and into sliding contact with said film of liquid, said helical path directed by said diaphram being inclined with respect to the natural direction of fall of the liquid reagent, so that the liquid film is deflected from the direction of its natural fall by the gas and the contact between the gaseous reagent and liquid reagent is increased, and outlet means at the bottom of said reactor for said gaseous stream and separate outlet means for said liquid stream, the lower portion of said reactor being conically widened to facilitate the separation of the gaseous stream from the liquid stream.

5. An apparatus as defined in claim 4 wherein said means to distribute said liquid reagent as a film on the vertical wall of the reactor comprises an annular port at the top of said reactor having a regulable opening in contact with the inner surface of the vertical wall of said reactor.

6. An apparatus as defined in claim 4 wherein said gaseous exit means for gas to exit from said cylinder into said reactor is provided with ports to feed said gas in the direction of the path provided by said helical diaphram.

7. An apparatus as defined in claim 4 wherein said helical diaphram mounted around said cylinder has the same geometric axis as that of said reactor, wherein said cylinder is rotatable about said geometric axis, wherein said apparatus further comprises means to rotating said cylinder about said axis.

References Cited

UNITED STATES PATENTS

| 391,865 | 10/1888 | Schutte. | |
| 793,110 | 6/1905 | Uehling | 23—283 XR |
| 1,284,488 | 11/1918 | Steward | 23—1 XR |
| 1,825,125 | 9/1931 | Polanyi et al. | 23—1 |

FOREIGN PATENTS 1,291,527   3/1962   France.

OSCAR R. VERTIZ, *Primary Examiner.*

EDWARD STERN, *Assistant Examiner.*